(12) United States Patent
Kaneko et al.

(10) Patent No.: US 9,096,122 B2
(45) Date of Patent: Aug. 4, 2015

(54) FUEL CUTOFF VALVE

(71) Applicant: TOYODA GOSEI CO., LTD., Kiyosu-shi, Aichi-ken (JP)

(72) Inventors: Kenichiro Kaneko, Kiyosu (JP); Kenta Kuwayama, Kiyosu (JP)

(73) Assignee: TOYODA GOSEI CO., LTD., Aichi-pref (JP)

( * ) Notice: Subject to any disclaimer, the term of this patent is extended or adjusted under 35 U.S.C. 154(b) by 10 days.

(21) Appl. No.: 13/850,418

(22) Filed: Mar. 26, 2013

(65) Prior Publication Data
US 2013/0276912 A1    Oct. 24, 2013

(30) Foreign Application Priority Data
Mar. 29, 2012  (JP) .................................. 2012-75455

(51) Int. Cl.
*F16K 24/04* (2006.01)
*B60K 15/035* (2006.01)

(52) U.S. Cl.
CPC ......... *B60K 15/03519* (2013.01); *F16K 24/044* (2013.01)

(58) Field of Classification Search
CPC ................ F16K 24/042; F16K 24/044; B60K 15/03504; B60K 15/035; B60K 15/03519
USPC ................... 137/202, 43; 251/127; 202/203.2
See application file for complete search history.

(56) References Cited

U.S. PATENT DOCUMENTS

| | | | |
|---|---|---|---|
| 4,781,218 A | 11/1988 | Mori et al. | |
| 6,170,510 B1* | 1/2001 | King et al. | 137/202 |
| 6,425,379 B2 | 7/2002 | Shimamura et al. | |
| 6,557,578 B2* | 5/2003 | Shimamura et al. | 137/202 |
| 6,843,267 B1* | 1/2005 | Van Schaftingen et al. | 137/202 |
| 6,843,268 B2* | 1/2005 | Yamada et al. | 137/202 |
| 8,141,576 B2 | 3/2012 | Matsuo | |
| 8,360,088 B2* | 1/2013 | Nishi et al. | 137/202 |
| 2004/0050418 A1* | 3/2004 | Yoshihara et al. | 137/202 |
| 2010/0051114 A1* | 3/2010 | Yamada et al. | 137/202 |

FOREIGN PATENT DOCUMENTS

| | | |
|---|---|---|
| JP | 63-6940 U | 1/1988 |
| JP | 2001-182633 A | 7/2001 |
| JP | 2009-168045 A | 7/2009 |

* cited by examiner

*Primary Examiner* — William McCalister
*Assistant Examiner* — Ian Paquette
(74) *Attorney, Agent, or Firm* — Posz Law Group, PLC

(57) ABSTRACT

A fuel cutoff valve is equipped with a casing main body having a valve chamber that forms a connection hole that is an opening to the valve chamber side on an upper wall, a cover that forms a pipe which forms a pipe passage, and a float housed inside the valve chamber. The cover is equipped with a pipe extended part which is provided extending inside the linking chamber from the pipe in a tube shape facing the connection hole and on an substantially straight line, the pipe extended part has an extended passage 45 connected to the pipe passage, the extended passage has an inflow port that opens to the linking chamber, and the inflow port is provided on the side opposite the pipe with the connection hole as the center.

8 Claims, 7 Drawing Sheets

FUEL CUTOFF VALVE

This application claims the benefit of and priority from Japanese Application No. 2012-75455 filed Mar. 29, 2012, the content of which is incorporated herein by reference.

BACKGROUND OF THE INVENTION

1. Field of the Invention

The present invention relates to a fuel cutoff valve for shutting a passage between a fuel tank interior and the exterior, mounted on the upper part of the fuel tank, and particularly relates to the structure of the passage to the exterior.

2. Description of the Related Art

A fuel cutoff valve is disclosed in JP2009-168045A. The fuel cutoff valve is mounted on the upper part of the fuel tank, and is equipped with a cylinder shaped housing having a connection hole on the upper part of the housing, a float that is housed in a valve chamber inside the housing, and a cover which covers the upper part of the housing and forms a linking chamber, and makes an air exhaust port projecting from the cover for connecting to a canister. The fuel cutoff valve, by opening and closing the connection hole of the housing by the rise and fall of the float, ensures ventilation of the fuel tank to the outside, and also prevents the outflow of fuel within the fuel tank to the outside.

With the fuel cutoff valve, to prevent the outflow of liquid fuel to the outside, the passage from the connection hole to the air exhaust port has a barrier wall provided enclosing the connection hole, and is constituted by cutting out a portion of the barrier wall. With the ventilation passage, since a labyrinthine structure is created by the barrier wall, the ventilation resistance becomes large, in other words, the pressure loss become large, so the structure made it difficult for fuel vapor to flow smoothly.

SUMMARY

An advantage of some aspects of the invention is to provide a fuel cutoff valve with a simple structure which prevents the outflow of liquid fuel from the connection hole to the exterior, and also reduces pressure loss when fuel vapor flows out to the exterior.

According to an aspect of the invention, there is a fuel cutoff valve for opening and closing a passage between an interior of a fuel tank and the exterior. The fuel cutoff valve comprises: a casing main body that has (i) an upper wall, (ii) a side wall projecting in a circular tube shape from an outer circumference part of the upper wall, (iii) a valve chamber enclosed by the upper wall and the side wall and connected to inside the fuel tank, and (iv) a connection hole formed on the upper wall and connected to the valve chamber, a cover that is fixed to an upper part of the casing main body, and has (i) a cover main body which together with the upper wall forms a linking chamber connected to the connection hole, and (ii) a pipe projecting from an outer wall of the cover main body and forming a pipe passage which connects the exterior and the linking chamber, and a float that is housed within the valve chamber which opens and closes the connection hole by rising and falling according to a fuel liquid level within the fuel tank. The cover includes a pipe extended part extending in an pipe shape from the linking chamber side of the pipe to above the connection hole. The pipe extended part has an extended passage connected to the pipe passage. The extended passage has an inflow port which opens to the linking chamber, the inflow port being disposed at an opposite side of the pipe in a radial direction from the center of the connection hole.

With the fuel tank using the fuel cutoff valve of the application example, by opening and closing the connection hole with the rise and fall of the float within the valve chamber according to the height of the fuel liquid level of the fuel tank due to fueling or the like, ventilation to the exterior is ensured through the valve chamber, the connection hole, the linking chamber, the extended passage, and the pipe passage.

There are cases when due to fueling or rocking back and forth of the vehicle, a fuel wave splash or an operational delay of the float occurs, and liquid fuel flows out of the connection hole. In this kind of situation, even if liquid fuel flows out from the connection hole, that liquid fuel is inhibited from flowing into the pipe passage by a pipe extended part. In other words, the pipe extended part is provided extending in an substantially round cylinder shape from the linking chamber side of the pipe until it reaches above the connection hole, and in fact, the inflow port of the extended passage is arranged at a location on the side opposite to the pipe with the connection hole as the center. Thus, the liquid fuel that flows out from the connection hole bumps into the outer wall of the pipe extended part and is returned to the connection hole, so it is difficult for it to directly flow out to the exterior from the inflow port through the extended passage and the pipe passage.

(2) With another application example, the fuel cutoff valve has the aforementioned pipe extended part arranged further upward from the aforementioned upper wall, and uses a space between the pipe extended part and the upper wall as a liquid storage chamber for storing liquid fuel from the connection hole. With this configuration, the fuel that flows out from the connection hole is temporarily stored in the liquid storage chamber between the pipe extended part and the upper wall, and then passes through the connection hole from the liquid storage chamber to return to the valve chamber. Specifically, even if the fuel cutoff valve is inclined along with an incline in the fuel tank, the liquid fuel that has flowed out from the connection hole is temporarily stored in the liquid storage chamber, and since it does not go past the liquid surface that flows into the inflow port it is even more difficult to flow out to the exterior through the extended passage.

(3) With another application example, the fuel cutoff valve is equipped on the outer wall facing the connection hole with a guide inclined surface for guiding the air flow that flows out from the connection hole to the side from the center of the connection hole. With this configuration, the guide inclined surface guides the air flow that flows out from the connection hole upward to the inflow port in a rectified state without turbulent flow or vortex flow occurring. Thus, the air flow that flows out from the connection hole flows in smoothly to the inflow port of the extended passage without increasing the flow path resistance, and is ventilated to the exterior through the extended passage and the pipe passage.

(4) With another application example, the fuel cutoff valve is equipped with a shielding projecting part facing opposite the connection hole that is provided projecting downward from the outside end part of the inflow port. This shielding projecting part is able to block the liquid fuel that flows out from the connection hole from facing toward the inflow port.

These and other objects, features, aspects, and advantages of the present invention will become more apparent from the following detailed description of the preferred embodiments with the accompanying drawings.

DESCRIPTION OF THE PREFERRED EMBODIMENTS

(1) Schematic Structure of Fuel Cutoff Valve 10

Figure 1:
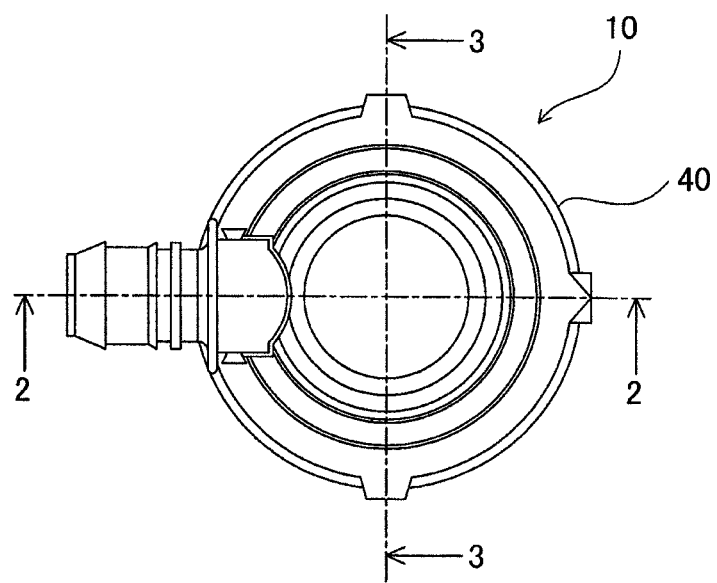
FIG. 1 is a plan view of the fuel cutoff valve of an embodiment of the present invention.
Figure 2:
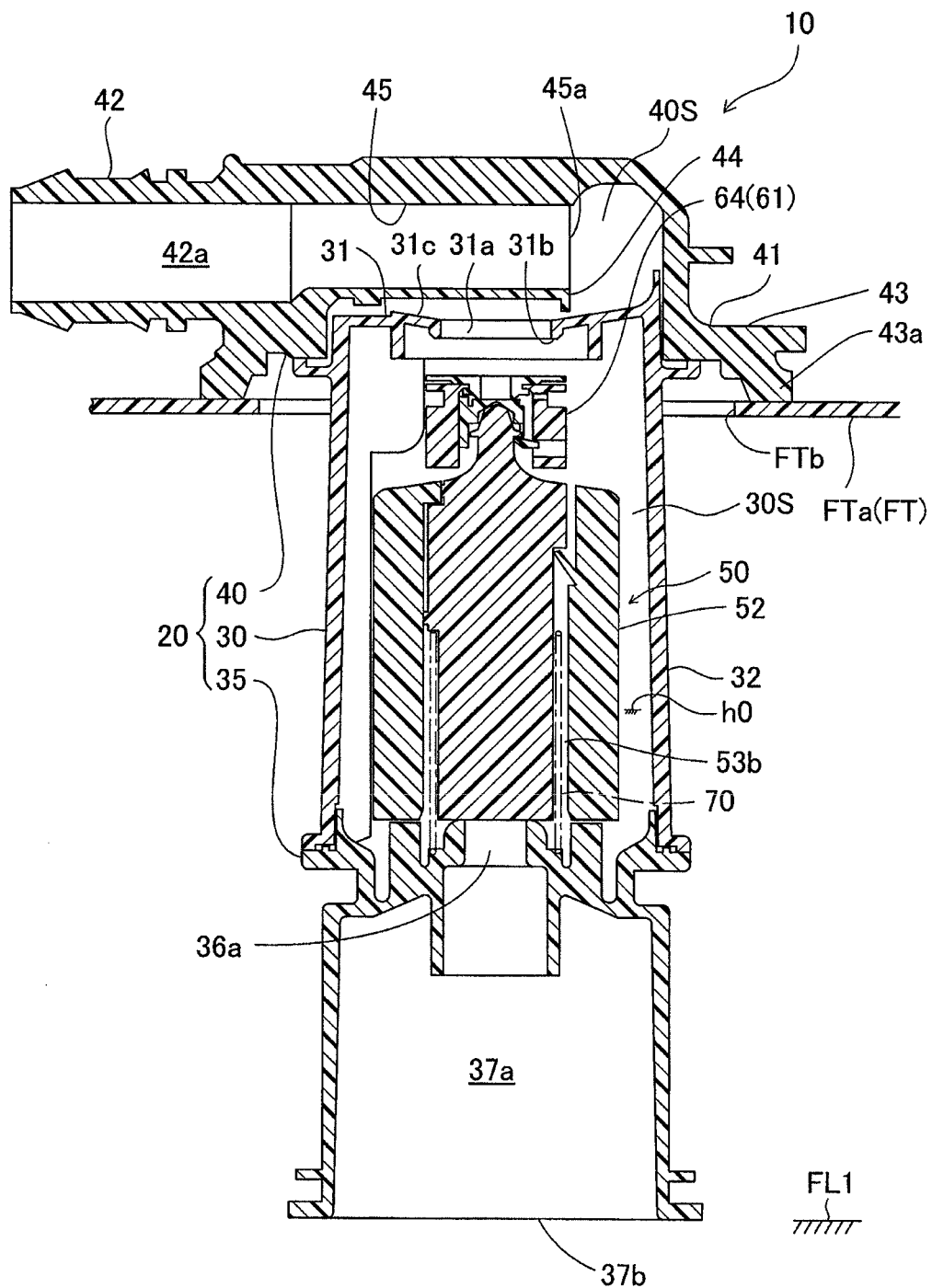
FIG. 2 is a cross section view along line 2-2 of FIG. 1.
Figure 3:
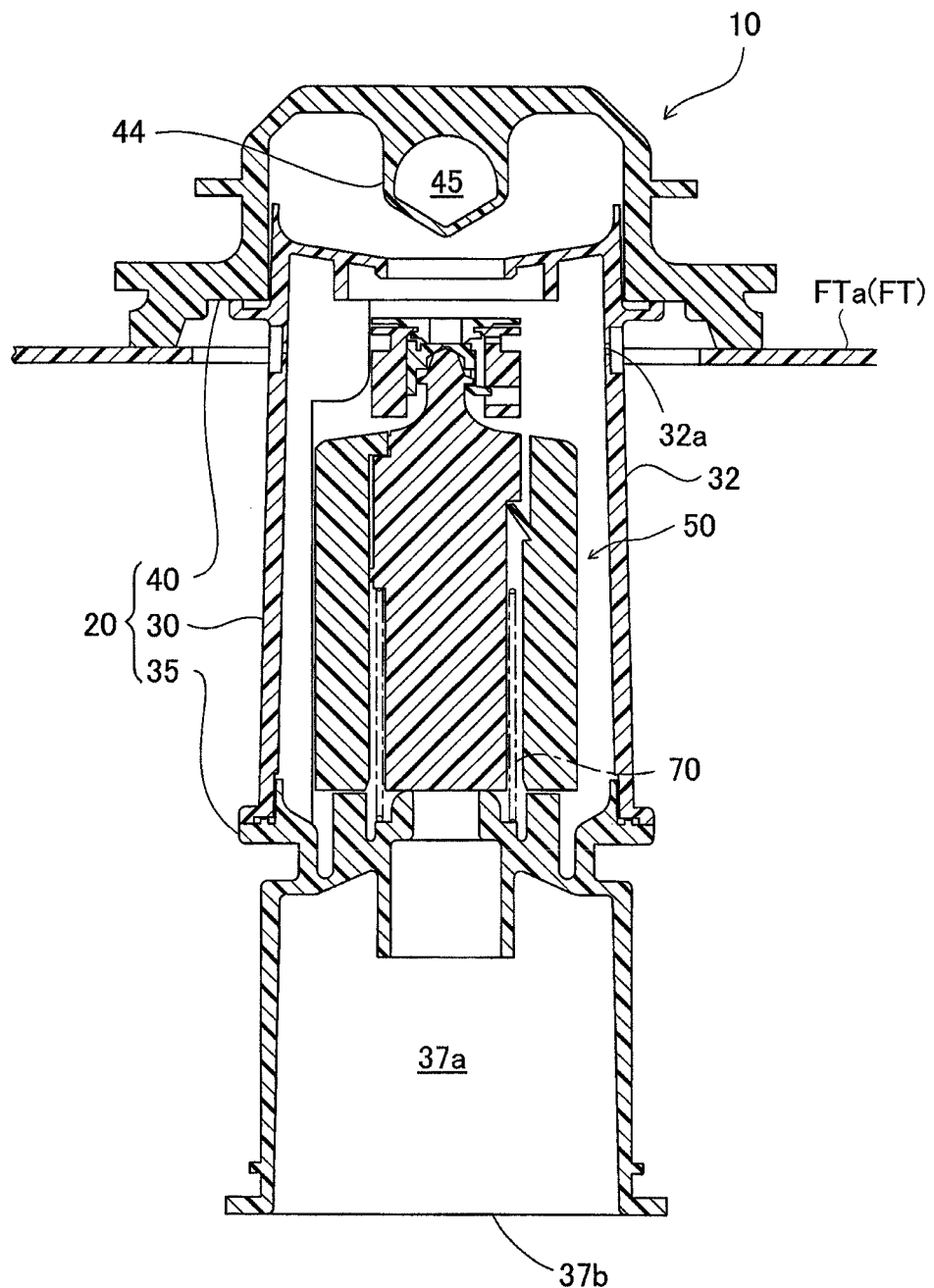
FIG. 3 is a cross section view along line 3-3 of FIG. 1.

FIG. 1 is a plan view of the fuel cutoff valve 10 of an embodiment of the present invention. FIG. 2 is a cross section view along line 2-2 of FIG. 1. FIG. 3 is a cross section view along line 3-3 of FIG. 1. In FIG. 2, A fuel tank FT has its surface formed from a composite resin containing polyethylene, and an attachment hole FTb is formed on a tank upper wall FTa. On the tank upper wall FTa, the fuel cutoff valve 10 is attached in a state with its bottom part penetrating in the attachment hole FTb. The fuel cutoff valve 10 is equipped with a casing 20, a float mechanism 50, and a spring 70 as major structural items. The casing 20 is equipped with a casing main body 30, a bottom member 35, and a cover 40, the spaced enclosed by the casing main body 30 and the bottom member 35 form a valve chamber 30S, and the float mechanism 50 supported by the spring 70 is housed in the valve chamber 30S. The fuel cutoff valve 10 lets fuel vapor within the fuel tank FT escape to the exterior, and also functions as an auto-stop which regulates the outflow of fuel within the fuel tank FT to the canister when fuel rises to a designated fluid level FL1 during fueling.

(2) Configuration of Each Part of the Fuel Cutoff Valve 10

Figure 4:
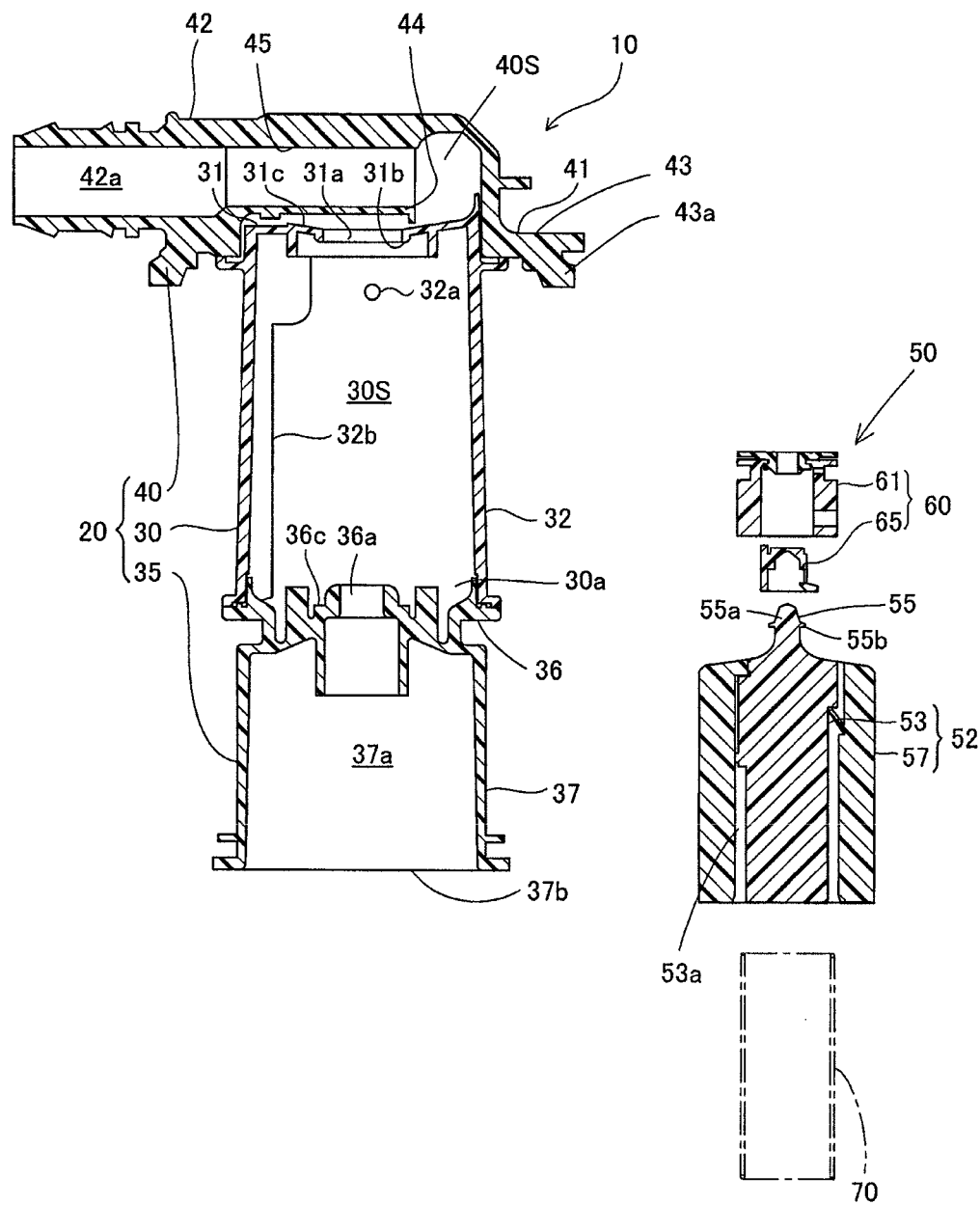
FIG. 4 is an exploded cross section of the fuel cutoff valve.

FIG. 4 is an exploded cross section view of the fuel cutoff valve 10. The casing main body 30 is a cup shape enclosed by an upper wall 31 and a side wall 32, and its bottom part is an opening 30a. A connection hole 31a is formed piercing the center part of the upper wall 31. A seal part 31b is disposed at the valve chamber 30S side of the connection hole 31a. Also, the upper wall 31 becomes an inclined wall 31c inclined downward toward the connection hole 31a.

A communication hole 32a that connects the interior of the fuel tank FT and the valve chamber 30S is formed at the upper part of side wall 32. Also, on the inner wall of the side wall 32, ribs 32b are provided at 4 to 8 locations that are provided in the circumference direction to guide the float 52. The bottom member 35 is a member for closing a portion of the opening 30a of the casing main body 30, and also for introducing fuel vapor and liquid fuel inside the valve chamber 30S. The bottom member 35 is formed as an integral unit with a bottom plate 36, and a round cylinder shaped introduction path forming member 37 provided projecting from the outer circumference part of the bottom plate 36, and is welded to the bottom edge of the casing main body 30 at the outer circumference part of the bottom plate 36.

A flow through hole 36a is formed on the bottom plate 36, and fuel vapor and liquid fuel are guided through the flow through hole 36a to the valve chamber 30S. Also, a spring support part 36c for supporting the bottom edge of the spring 70 is formed on the top surface of the bottom plate 36. The introduction passage forming member 37 is equipped with an introduction passage 37a. The introduction passage 37a is a passage for guiding fuel vapor and liquid fuel taken in from the bottom edge opening part 37b into the valve chamber 30S through the flow through hole 36a.

Figure 5:
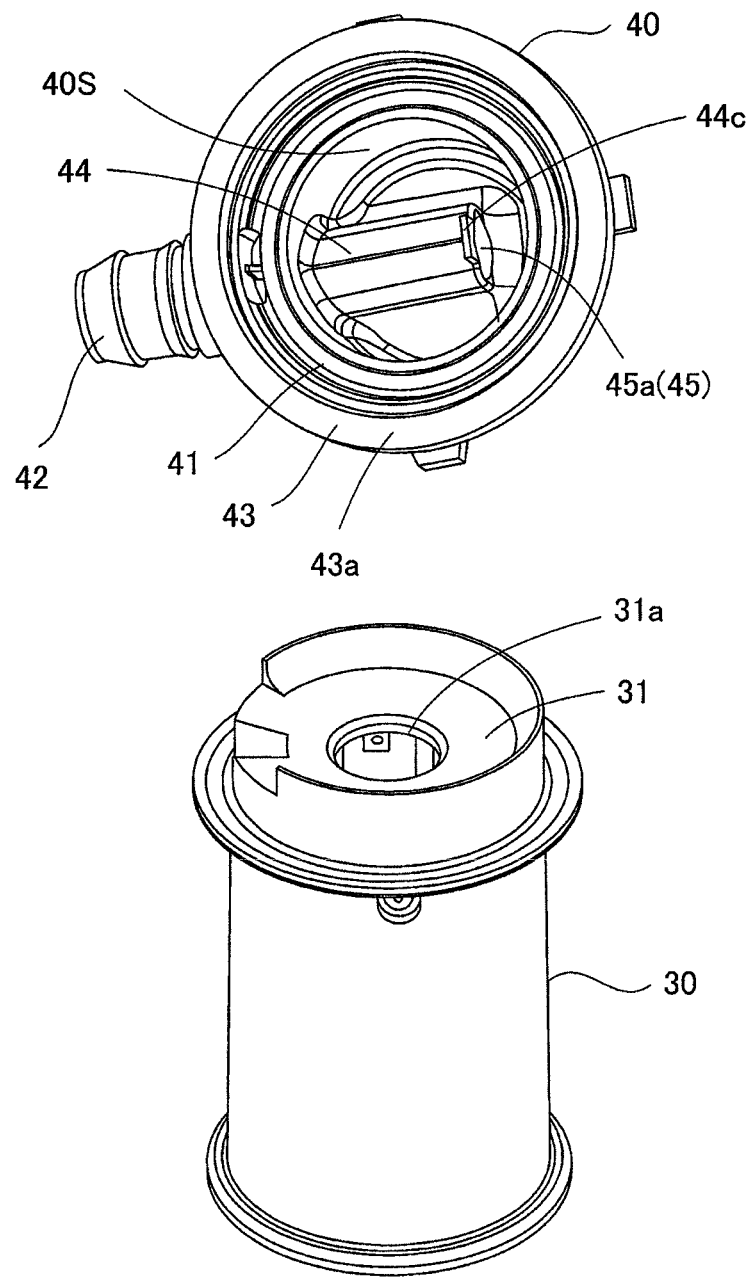
FIG. 5 shows the state with the cover removed from the casing main body.

FIG. 5 is an explanatory drawing for describing the state with the cover 40 removed from the casing main body 30. The cover 40 is equipped with a cover main body 41, a pipe 42 projecting to the side from the outer circumference part of the cover main body 41, and a pipe extended part 44 provided extending from the inner end part of the pipe 42, and the space enclosed by the upper part of the casing main body 30 and the cover 40 is used as the linking chamber 40S. A flange 43 is welded to the upper part of the casing main body 30, and the tank upper wall FTa of the fuel tank FT is welded at the outside welded part 43a (see FIG. 2).

Figure 6:
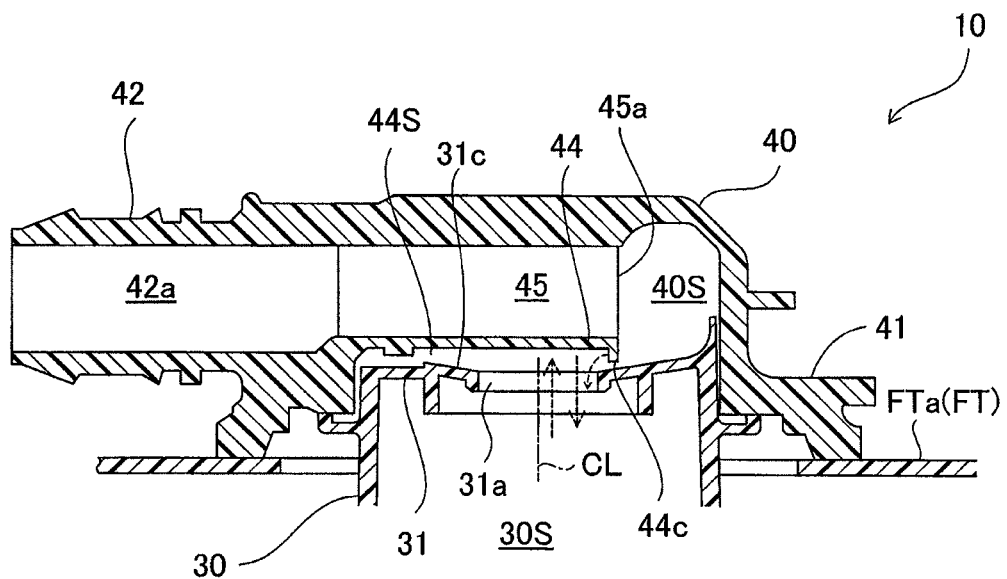
FIG. 6 is a cross section view showing the upper part of the fuel cutoff valve of FIG. 2.
Figure 7:
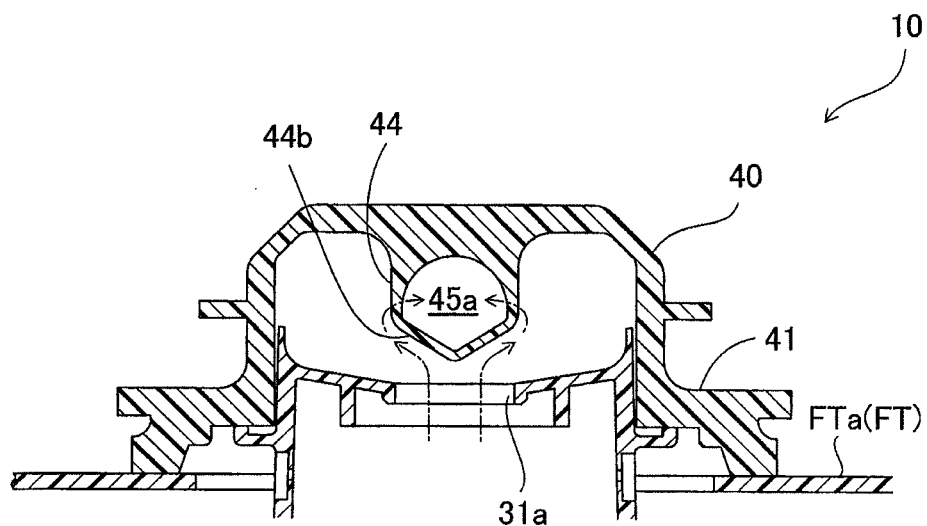
FIG. 7 is a cross section view showing the upper part of the fuel cutoff valve of FIG. 3.

FIG. 6 is a cross section view showing the upper part of the fuel cutoff valve 10 of FIG. 2, and FIG. 7 is a cross section view of the upper part of the fuel cutoff valve 10 of FIG. 3. The interior of the pipe 42 becomes the circular cross section pipe passage 42a, and the interior of the pipe extended part 44 becomes the extended passage 45 connected to the pipe passage 42a. As shown in FIG. 7, with the extended passage 45, the upper part is a semicircle, and the lower part is an isosceles triangle, and is connected with a continuous curved surface to the circular cross section pipe passage 42a. One end of the pipe passage 42a is connected to the canister (illustration omitted side), and one end of the extended passage 45 connected to the pipe passage 42a becomes the inflow port 45a. The inflow port 45a is provided at the side facing opposite the pipe 42 with the connection hole 31a as the center, and opens to the linking chamber 40S, and by doing this, the extended passage 45 is connected to the valve chamber 30S of the casing main body 30 through the connection hole 31a. Also, the pipe extended part 44 is arranged separated by a designated distance upward in relation to the upper wall 31, and a portion of the linking chamber 40S between the pipe extended part 44 and the upper wall 31 becomes the liquid storage chamber 44S. With the liquid storage chamber 44S, the cover 40 and the casing main body 30 are welded, so this needs to be made liquid-tight to the exterior, and since a portion of the upper wall 31 becomes the inclined wall 31c, it becomes a space that is inclined downward toward the connection hole 31a. Also, at the outside end part of the inflow port 45a which is the end part of the pipe extended part 44, the shielding projecting part 44c is provided projecting downward and formed at a location facing opposite the connection hole 31a.

In FIG. 7, the surface facing opposite the connection hole 31a which is the bottom surface of the pipe extended part 44 becomes the guide inclined surface 44b which is laterally symmetrical with the center of the connection hole 31a as the axis. The guide inclined surface 44b guides the air flow that flows out from the connection hole 31a to both sides from the center of the connection hole 31a. The operation and the like of the pipe extended part 44 and the like will be described later.

As shown in FIG. 4, the float mechanism 50 has a two stage valve structure which improves the valve reopening characteristics, and is equipped with a float 52 and an upper valve unit 60 arranged at the upper part of the float 52. The float 52 is equipped with a first float part 53 and a second float part 57, and these are assembled as an integrated unit. A valve support part 55 is provided projecting at the upper part of the first float part 53. The valve support part 55 is equipped with a support projecting part 55a which is a part that supports the upper valve unit 60 to be able to bobble, and is an substantially cone shaped projection (convex shape), and a ring shaped projecting part 55b is formed to retain the upper part valve unit 60 on the outer circumference part of the valve support part 55. At the gap of the outer circumference part of the first float part 53 and the inner circumference part of the second float part 57, a spring housing gap 53a is provided, and the spring 70 is arranged.

Figure 8:
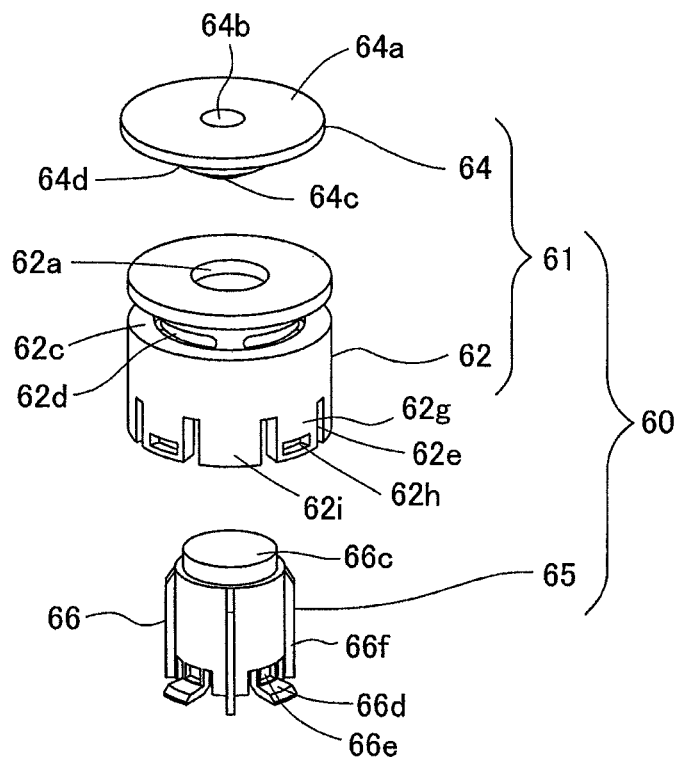
FIG. 8 is an exploded perspective view showing a first valve unit and a second valve unit constituting the upper part valve unit.
Figure 9:
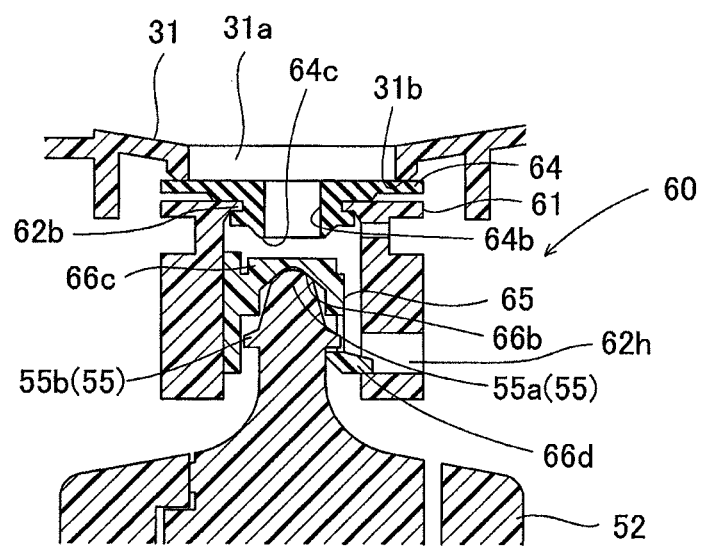
FIG. 9 is a cross section view showing the upper part valve unit.

The upper part valve unit 60 is a valve that opens and closes the connection hole 31a and also improves the valve reopening characteristics, and is supported on the valve support part 55 of the float 52 to be able to rise and fall as well as bobble. FIG. 8 is an exploded perspective view showing the first valve unit 61 and the second valve unit 65 that constitute the upper part valve unit 60, and FIG. 9 is a cross section view showing the upper part valve unit 60. The first valve unit 61 is equipped with an substantially round cylindrical first valve main unit 62 and a sheet member 64. A support hole 62a is formed in the axial direction inside the first valve main unit 62. An attachment part 62b for attaching the sheet member 64 is formed on the upper part of the first valve main unit 62. A ring shaped recess 62c is formed at the outer circumference part of the first valve main unit 62, and ventilation holes 62d are formed at four locations to connect the support hole 62a on that ring shaped recess 62c to the exterior. A slit 62e is formed at the bottom part of the first valve main unit 62, and using the slit 62e, an engaging piece 62g is formed to be elastically deformable from a fixing piece 62i. An engaging hole 62h is formed on the engaging piece 62g.

The sheet member 64 is equipped with a first sheet part 64a which is detachable with the seal part 31b, a communication hole 64b connected to the support hole 62a, a seal part 64c formed at the bottom edge part of the communication hole 64b, and an attachment part 64d, and these are molded as an integral unit using a rubber material. The sheet member 64 is mounted on the attachment part 62b of the first valve main unit 62 by the attachment part 64d, and by the first sheet part 64a having a gap in relation to the top surface of the first valve main unit 62, the sealing properties are increased by doing elastic deformation when seated on the seal part 31b.

The second valve unit 65 is equipped with a round cylinder shaped second valve main unit 66. A hole with a bottom that opens downward is formed on the second valve main unit 66, and at the bottom center part of this hole with a bottom is formed a concave shaped part to be supported 66b. By the part to be supported 66b being placed on the valve support part 55 of the float 52, the second valve unit 65 is supported to be able to bobble with the valve support part 55 as the fulcrum.

Also, a second sheet part 66c is formed on the top surface of the second valve main unit 66, and this second sheet part 66c is formed so as to open and close the communication hole 64b by attaching and detaching with the seal part 64c of the first valve unit 61. At the bottom part of the second valve main unit 66, retention hooks 66d are formed at four locations, and by engaging these in the engaging hole 62h of the first valve main unit 62, the first valve unit 61 is supported to be able to rise and fall in relation to the second valve unit 65. An engaging hole 66e is formed on the upper part of each retention hook 66d, and by engaging this in the ring shaped projecting part 55b of the float 52, the second valve unit 65 is supported to be able to rise and fall and retained in relation to the float 52. Also, a guide protrusion 66f for guiding the second valve unit 65 in the vertical direction is formed at the outer circumference part of the second valve main unit 66. The guide protrusion 66f is provided projecting in a rib shape in the up and down direction at four locations at equal intervals in the circumference direction on the side wall of the second valve main unit 66, and is made to be able to slide on the inner wall surface of the support hole 62a.

Also, the center of gravity of the upper part main unit 60 is set downward from the part to be supported 66b. As the configuration for this, the fixing piece 62i is formed to make the downward weight greater. Also, by making the valve support part 55 a convex shape, and making the part to be supported 66b a concave shape, it is possible to match the center of the upper part valve unit 60 and the float 52 easily, and in fact it is easy to set the center of gravity in relation to the fulcrum downward, so the position of the upper part valve unit 60 is also stable.

(3) Operation of the Fuel Cutoff Valve 10

Next, we will describe the operation of the fuel cutoff valve 10. As shown in FIG. 2, with the fueling gun (not illustrated), when fuel is supplied into the fuel tank FT, as the fuel fluid level inside the fuel tank FT rises, the fuel vapor stored at the upper part inside the fuel tank FT flows from the introduction passage 37a of the bottom member 35 and the flow through hole 36a into the valve chamber 30S. Furthermore, the fuel vapor is made to escape from the valve chamber 30S to the canister side through the connection hole 31a, the linking chamber 40S, extended passage 45, and the pipe passage 42a. Then, when the fuel fluid level inside the fuel tank FT reaches a designated fluid level FL1, by the liquid fuel blocking the opening part 37b, the tank internal pressure within the fuel tank FT rises. In this state, the pressure difference between the tank internal pressure and the pressure within the valve chamber 30S becomes larger, so the liquid fuel flows through the introduction passage 37a and the flow through hole 36a into the valve chamber 30S, and the fuel fluid level inside the valve chamber 30S rises. When the fuel fluid level inside the valve chamber 30S reaches height h0, by the balance of the upward force by the buoyancy of the float 52 and the load of the spring 70 and the downward force by the weight of the float mechanism 50 itself, the former goes above the latter and the float mechanism 50 becomes an integral unit and rises, and the sheet member 64 of the first valve 61 sits on the seal part 31b and closes the connection hole 31a. At this time, the fuel inside the inlet pipe accumulates, and when the fuel contacts the fueling gun (not illustrated), auto-stop goes into operation. By doing this, during fueling to the fuel tank and the like, it is possible to have the fuel vapor escape from the fuel tank and also to prevent the outflow of fuel to outside the fuel tank.

Meanwhile, when the fuel inside the fuel tank FT is consumed and the fuel fluid level decreases, the float 52 buoyancy decreases and it drops. By the dropping of the float 52, the float 52 pulls down the second valve unit 65 via the engagement of the retention hook 66d of the second valve unit 65 and the ring shaped projection 55b of the float 52 shown in FIG. 9. By doing this, the second sheet part 66c separates from the seal part 64c, and opens the communication hole 64b. By the communication of the communication hole 64b, the lower pressure of the first valve unit 61 becomes the same pressure as the vicinity of the connection hole 31a. Since the retention hook 66d is engaged in the engagement hole 62h, the first valve unit 61 is also pulled down via the second valve unit 65. Then, by the first valve unit 61 dropping, the sheet member 64 separates from the seal part 31b and the connection hole 31a opens. By setting the passage surface area of the communication hole 64b to be smaller than the passage surface area of the connection hole 31a in this way, the upper part valve unit 60 can open the valve with a small force, and this acts so as to promote improvement in the valve reopening characteristics.

(4) Embodiment Operations and Effects

With the constitution of the embodiments, the following operations and effects are exhibited.

(4)-1 In FIG. 2, with the fuel tank FT using the fuel cutoff valve 10, by opening and closing the connection hole 31a with the rise and fall of the float 52 within the valve chamber 30S according to the height of the fuel liquid level of the fuel tank FT with fueling or the like, in addition to ensuring ventilation to the exterior through the valve chamber 30S, the connection hole 31a, the linking chamber 40S, the extended passage 45, and the pipe passage 42a, it is also possible to prevent the outflow of liquid fuel to the outside.

(4)-2 There are cases when due to fueling or rocking back and forth of the vehicle, a fuel wave splash or an operational delay of the float 52 occurs, and liquid fuel flows out of the connection hole 31a. In the situation, as shown in FIG. 6, even if liquid fuel flows out from the connection hole 31a, that liquid fuel is inhibited from flowing into the pipe passage 42a by a pipe extended part 44. In other words, the pipe extended part 44 is arranged above the connection hole 31a, and in fact, the inflow port 45a of the extended passage 45 is arranged at a location on the side opposite to the pipe 42 in relation to the axis CL as the center of the connection hole 31a. Thus, the liquid fuel that flows out from the connection hole 31a bumps into the outer wall of the pipe extended part 44 and is returned to the connection hole 31a, so it is difficult for it to directly flow out to the exterior from the inflow port 45a through the extended passage 45 and the pipe passage 42a.

In fact, the position of the inflow port 45a of the extended passage 45 is arranged near the hole circumference edge or past the hole circumference edge of the connection hole 31a, in other words, since the pipe extended part 44 is arranged above the connection hole 31a across the entire length, it is possible to prevent the inflow of liquid fuel from the inflow port 45a.

(4)-3 The pipe extended part 44 is arranged above the upper wall 31, and uses a space between the pipe extended part 44 and the upper wall 31 as a liquid storage chamber 44S to temporarily store liquid fuel that has flowed out from the connection hole 31a, and returns it to the valve chamber 30S through the connection hole 31a. Specifically, even if the fuel cutoff valve 10 is inclined along with an incline of the vehicle, the liquid fuel that has flowed out from the connection hole 31a is temporarily stored in the liquid storage chamber 44S, and since it does not go past the liquid surface that flows into the inflow port 45a, it is even more difficult to flow out to the exterior through the extended passage 45.

(4)-4 As shown in FIG. 7, the pipe extended part 44 has on the outer wall facing the connection hole 31a a guide inclined surface 44b for guiding the air flow that flows out from the connection hole 31a to the side from the center of the connection hole 31a. The guide inclined surface 44b guides the air flow that flows out from the connection hole 31a upward to the inflow port 45a (FIG. 6) in a rectified state without turbulent flow or vortex flow occurring. Thus, the air flow that flows out from the connection hole 31a flows in smoothly, and is ventilated to the exterior through the extended passage 45 and the pipe passage 42a without increasing the flow path resistance in the inflow port 45a of the extended passage 45.

(4)-5 As shown in FIG. 6, the extended passage 45 is provided extending on a straight line in the horizontal direction on the pipe passage 42a, so for air flow facing from the linking chamber 40S to the pipe passage 42a, this does not become a complex detour passage, and there is no increase in flow path resistance.

(4)-6 As shown in FIG. 6, the pipe extended part 44 is equipped with a shielding projecting part 44c (FIG. 5) provided projecting downward from the outside end part of the inflow port 45a and at a location facing opposite the connection hole 31a, so it is able to block the liquid fuel that flows out from the connection hole 31a from facing toward the inflow port 45a.

This invention is not limited to the embodiments, and it is possible to implement it with various modes in a scope that does not stray from its gist, with the following kinds of modifications possible, for example.

With the extended section part 44 of the embodiments, considering prevention of the outflow of liquid fuel to the pipe passage 42a side, and a reduction in pressure loss to the pipe passage 42a, as long as the operations and effects of the present invention are not lost, it is possible to have various shapes and heights other than a circular cross section.

The tank flow path structural unit of the embodiments used a full tank regulation valve that closes the connection hole when at the full tank fluid level during fueling, but this is not limited to this, and it is also possible to use a rollover valve that prevents the outflow of the fuel tank FT when the vehicle is inclined and the like.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel cutoff valve for opening and closing a passage between an interior of a fuel tank and an exterior of the fuel tank, the fuel cutoff valve comprising:
   a casing main body having an upper wall, a side wall projecting in a circular tube shape from an outer circumference part of the upper wall, a valve chamber enclosed by the upper wall and the side wall and connected to the interior of the fuel tank, and a connection hole formed at the upper wall and connected to the valve chamber, the connection hole having a center and an axis passing through the center of the connecting hole,
   a cover that is fixed to an upper part of the casing main body, and the cover having a cover main body which together with the upper part and the upper wall of the casing main body encloses a space forming a linking chamber connected to the connection hole, and a pipe projecting from an outer wall of the cover main body and forming a pipe passage connecting the exterior of the fuel tank and the linking chamber, and
   a float that is housed within the valve chamber, the float opening and closing the connection hole by rising and falling according to a fuel liquid level within the fuel tank,
   wherein the cover includes a pipe extended part having a pipe shape and extending from an end of the pipe to above the connection hole, the pipe extended part having an extended passage connected and extending parallel to the pipe passage, the extended passage having an inflow port that opens to the linking chamber, the inflow port having an opening with edges extending in a radial direction of the extended passage and forming a plane parallel to the axis of the connection hole, the inflow port being disposed at an opposite side of the end of the pipe in a radial direction from a center of the connection hole, and the pipe, the pipe extended part and the cover existing within a single integrally formed material.

2. The fuel cutoff valve according to claim 1, wherein the pipe extended part includes a shielding projecting part that projects downward from the outside end of the inflow port, and the shielding projecting part is disposed at a position facing the connection hole.

3. The fuel cutoff valve according to claim 1, wherein the pipe extended part includes a guide inclined surface on an outer wall facing the connection hole, the guide inclined surface being arranged above the connecting hole and being configured to guide air flow exiting from the center of the connection hole to sides of the pipe extending part and being laterally symmetrical with the axis of the connection hole.

4. The fuel cutoff valve according to claim 3, wherein the pipe extended part includes a shielding projecting part that projects downward from the outside end of the inflow port, and the shielding projecting part is disposed at a position facing the connection hole.

5. The fuel cutoff valve according to claim 1, wherein the pipe extended part is arranged above the upper wall, and the pipe extended part and the upper wall form a fluid storage chamber between the pipe extended part and the upper wall, the fluid storage chamber being configured to store a liquid fuel flowing out from the connection hole.

6. The fuel cutoff valve according to claim 5, wherein the pipe extended part includes a shielding projecting part that projects downward from the outside end of the inflow port, and the shielding projecting part is disposed at a position facing the connection hole.

7. The fuel cutoff valve according to claim 5, wherein the pipe extended part includes a guide inclined surface on an outer wall facing the connection hole, the guide inclined surface being arranged above the connecting hole and being configured to guide air flow exiting from the center of the connection hole to sides of the pipe extending part and being laterally symmetrical with the axis of the connection hole.

8. The fuel cutoff valve according to claim 7, wherein the pipe extended part includes a shielding projecting part that projects downward from the outside end of the inflow port, and the shielding projecting part is disposed at a position facing the connection hole.

* * * * *